June 16, 1953  J. M. BRADLEY  2,642,341
LIQUID-LIQUID EXTRACTION TOWER
Filed Aug. 10, 1950
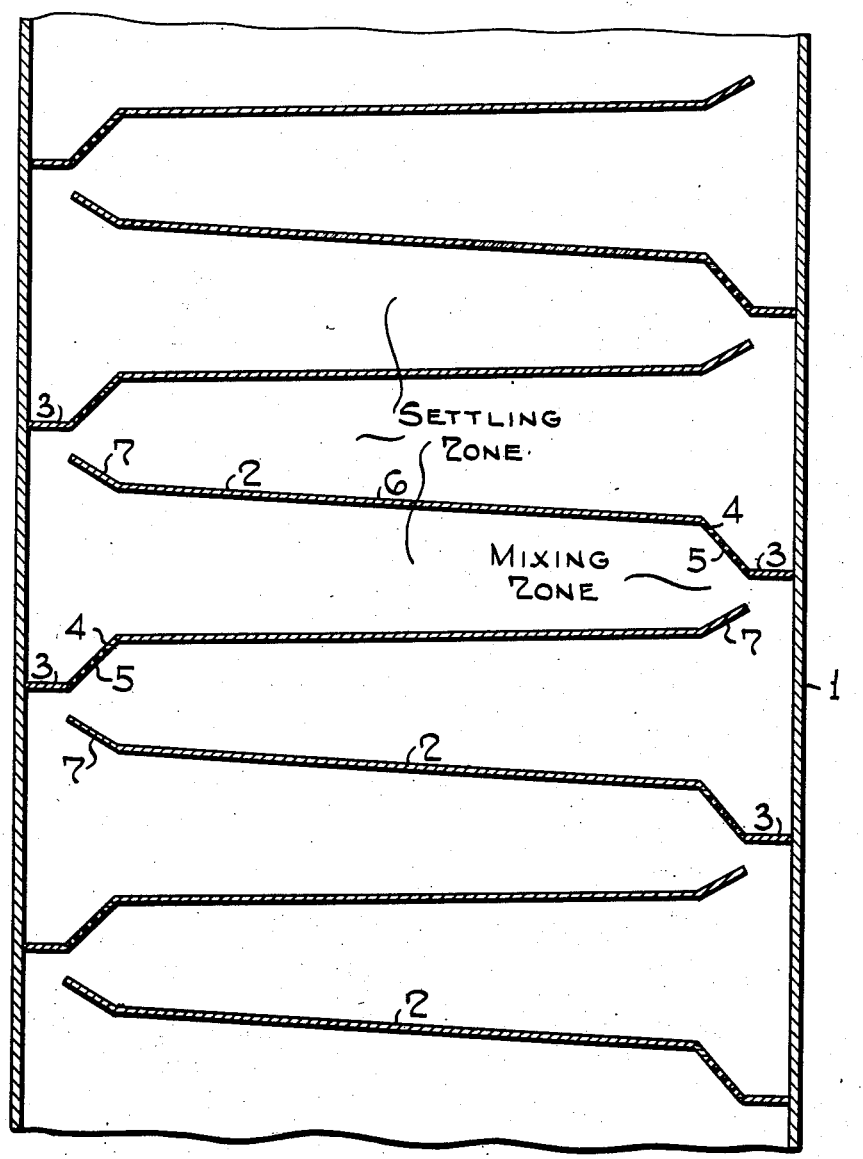
John M. Bradley Inventor
By W. O. Heilman Attorney Patented June 16, 1953

2,642,341

UNITED STATES PATENT OFFICE 2,642,341

LIQUID-LIQUID EXTRACTION TOWER

John M. Bradley, Pampa, Tex., assignor to Standard Oil Development Company, a corporation of Delaware Application August 10, 1950, Serial No. 178,569

6 Claims. (Cl. 23—270.5)

This invention relates to an improved process and apparatus for the contacting of two normally immiscible or partly miscible liquids. The invention is adapted for the contacting of liquids making up any liquid-liquid system. In accordance with the present invention novel perforated plates are employed in a vertical tower characterized by a comparatively wide, or unrestricted passage through the tower for one liquid phase, sloped perforated portions of the plates through which the second liquid phase may be jetted, and provision to permit the smooth merging of mixing and settling zones defined by the plates.

The invention is directed broadly to processes in which liquids are fractionated by selective solvent action. At the present time there are a great many chemical processes in which a selective solvent is used to treat a particular liquid in order to secure a partial segregation, or fractionation of chemical constituents of the liquid. For example, petroleum oils are conventionally treated with solvents such as liquid sulphur dioxide, phenol, cresols, nitrobenzene, furfural, aniline, ether and other solvents or mixture of such solvents. Use of these solvents with petroleum oils is particularly employed to remove low viscosity index constituents of the oil, to obtain a treated oil having an improved viscosity index. More generally such solvent treating processes are employed to selectively remove undesired constituents from the liquid being treated with the solvent, or in some cases to recover desired constituents.

In solvent treating operations of the general character above described, many modifications are used to control the solvent extraction process as desired. For example, auxiliary solvents, or modifying agents, may be injected into the treating system. Again, a wide range of temperature and pressure conditions may be employed in particular types of solvent extractions. The present invention is not concerned with the modifications or refinements of solvent treating processes. However, the invention is concerned with the basic method and apparatus used for contacting liquids whatever the particular system may be. It is, therefore, to be understood that this invention is of application to any liquid-liquid contacting system with any of the modifications, which may be employed in such processes.

Many methods have been devised for the contacting of liquids. However, it has been found most advantageous to effect large volume interfluid treating in contacting towers rather than in mixers and settlers, centrifuges, etc. Processing in towers is more advantageous from the economic viewpoint because of the lower initial and operating costs. Consequently considerable attention has been given to the apparatus required for efficient liquid-liquid contacting in towers. The towers which have been employed have been of a wide variety of types; some employing various types of packing materials, others employing bubble cap plates, and others employing a wide variety of internal baffles. However, of the various types of fluid contacting towers developed, those involving the use of pierced plates have proved to be particularly advantageous in the processing of large quantities of liquids.

Conventional pierced plate towers consist of a large number of horizontally disposed perforated plates extending throughout the tower. The plate perforations provide orifices through which at least one of the liquids may be dispersed. Heretofore, the pierced plates known to the art have been characterized by plate efficiencies not substantially greater than about 50% and in some liquid-liquid systems, as low as about 10%. By plate efficiency as that term is used, it is meant that each plate is effective in accomplishing a particular percentage of the efficiency of contact which can be achieved in a single stage, equilibrium, batch mixer and settler. Thus, one theoretical stage is established by contacting two liquids intimately in a batch mixer followed by a thorough settling in a batch settler. As stated, therefore, conventional pierced plate liquid contacting towers, due to their plate efficiency of about 50%, substantially require a number of plates greater than twice the number of theoretical stages of contacting required. It is clearly of the greatest importance to improve the plate efficiency of the types of pierced plates used in such towers in order to decrease the expense of the contacting and to decrease the size of the towers necessary. It is, therefore, the principal object of this invention to provide an improved type of pierced plate extraction tower in which the plate efficiencies are substantially above 50%.

In analyzing the necessary mechanism required in liquid-liquid contacting it is apparent that two basic effects are required. These are efficient mixing of the liquids followed by efficient separation of the mixed liquids. Thus, in extraction towers having a given number of plates, for best over-all results it is necessary that each set of plates provide good mixing and provide good settling. Only by achieving both of these desiderata in such a tower is it possible to secure treating effects equivalent to a large number of theoretical stages. Conversely, considering any one pair of extraction plates, high plate efficiencies can only be obtained if the plates are capable of both thoroughly mixing and thoroughly separating the mixed liquids. It is, therefore, a further and more particular object of this invention to provide a type of pierced plate which will most effectively be capable of thoroughly mixing and thoroughly settling liquid phases passing through each pair of plates.

In the development of suitable perforated plates according to the foregoing principles, numerous difficulties have been encountered. For example, it may happen that a particular plate construction will permit a liquid phase to flow through perforations of the tray through which it is not desirable that this particular liquid phase should flow. In other words it has been difficult to direct the passage of liquids through pierced plate towers so that the liquids will pass through the perforations in the desired manner. For example, a particular perforated plate may be provided with dispersion holes through which a heavier liquid phase is expected to descend, but which, however, may permit an appreciable amount of the lighter liquid to rise therethrough. This effect is just as though the lighter liquid phase were permitted to bypass completely the plate in question as little or no contacting will be obtained when the liquid phase passes upwardly through heavy phase dispersion holes.

Another problem which has been encountered in the development of suitable perforated plates is peculiar to the contacting problem in which it is desired to contact a relatively fluid phase with a relatively viscous liquid. If the more viscous liquid phase is forced to pass through perforations provided in the plates of a contacting tower, excessive pressure may be required to move the viscous phase from plate to plate through the tower. Furthermore, the less viscous liquid phase may resist dispersion in the more viscous phase under these conditions, so as to lower the throughput of the tower.

A still further problem specifically associated with perforated liquid-liquid contacting plates is the possibility for remixing settled liquid phases so as to decrease the contacting efficiency. Thus, in perforated plate towers no clear boundary generally exists between mixing and settling zones provided on a given plate so that opportunity exists for undesired remixing, particularly when eddies and high velocity flows are maintained adjacent to the settling zone.

It is the specific object of this invention to overcome these problems ordinarily encountered in perforated plate contacting towers.

In accordance with this invention, a tower is employed which is provided with a plurality of contacting plates characterized by the absence of any sharp corners, or steplike projections. Thus, considering a particular plate embodying this invention, liquid is enabled to flow over this plate in a manner minimizing any eddying of the liquid ordinarily encountered if the liquid were to be passed over stepwise projections of the plate. Each of the plates of the tower may be fabricated so as to provide four planes in which the angles defined by the juncture of any two adjoining planes is in all cases greater than about 120°. By simply perforating all, or a portion of one of the four planes of the plate, and by assembling a tower in which each successive plate is in a reversed relationship, the complete extraction tower may be fabricated.

The plate assembly of this invention may be fully appreciated from the following description of the accompanying drawing in which the sole figure diagrammatically illustrates, in cross-section, an embodiment of the invention.

Referring to the drawing, the numeral 1 designates the shell, or wall of a vertical tank or tower. The tower is generally of circular cross-section and is closed at top and bottom, and is equipped with liquid inlets and outlets at the top and bottom of the tower for introduction and removal of the liquids to be contacted. The tower is equipped with a large number of more or less horizontally disposed, vertically displaced contacting plates identified by the numerals 2. Referring to any one of the plates, the plate is joined to and supported by the tower 1 on one side thereof by means of a short horizontal plane of the plate designated by the numeral 3. An upwardly inclined plane of the plate 4 is provided with perforations 5 and is joined to a sloping unperforated plane 6. Sloping plane 6 is again joined to a more sharply inclined plane 7. The total plate 2, therefore, consists of the flat planes 3, 4, 6 and 7. The comparative dimensions and arrangement of the different planes of the plate may be varied within reasonable limits, and in fact must be varied somewhat depending upon the particular liquid-liquid system to be contacted. Thus, the degree of inclination of the different planes of the plate, the comparative length of plane number 6 to the other planes of the plate, and the total area of plane 4 which is perforated by perforations 5 must be selected by design procedures so as to permit best the contacting of a given liquid-liquid system.

The perforations 5 may simply be provided by drilling, or boring a large number of holes in the inclined plane 4. The size of the holes is not ordinarily critical within the range of about ¼" to ¾", or greater. Thus, it has been found that liquids may be jetted through holes of this general size so as to secure good dispersion in another liquid contacted by these jets. It is apparent that, if desired, perforations other than drilled holes may be provided in the plates 4, provided they are of the character to cause liquids passing therethrough to assume the form of a plurality of constricted liquid streams. Each of the successively higher plates 6 are rotated in a horizontal plane through 180° so as to be in a reversed relationship with the next lower plate as illustrated in the drawing. By this means the unrestricted opening between the tower wall 1 and the termination of plane 7 of one plate is brought directly below plane 3 of the next higher plate. This also has the effect, in considering any two pairs of plates, of providing an enlarged space between adjacent plates as liquid moves away from the perforations 5 across the plate.

As indicated, plane 3 may be substantially horizontal although if desired the plane can be somewhat inclined. Plane 4 can be maintained at an angle of about 20° to 70° with the horizontal, although preferably is positioned at an inclination of about 45°. Plane 6 may be horizontal but preferably has an inclination of about 1.0° to 6.0°, while plane 7 preferably has about the same inclination as plane 4. Again, it may be stated that the particular degrees of inclination chosen from the indicated ranges must be selected with regard to a particular liquid-liquid system. While critical inclinations may be selected for a given liquid-liquid system, no generalization may be made as to particular inclinations to be employed in all cases.

In considering the operation of the plate structure described, a light phase liquid will be introduced to tower 1 at the bottom thereof, while a heavy phase liquid to be contacted with the light phase liquid will be introduced at the top of tower 1. The heavy phase and light phase liquids will generally move countercurrently through the tower so that heavy phase liquid may be withdrawn from the bottom of the tower, and light phase liquid may be withdrawn from the top of the tower. For clarity, let it be assumed that a lubricating oil constitutes the light phase liquid to be contacted, while phenol constitutes the heavy phase liquid to be contacted. Oil moving upwardly through the tower will pass through the unrestricted passage provided between the terminations of planes 7 and tower 1, and thence in a direction generally across the plates. As the oil thus moves more or less horizontally beneath dispersion holes 5, phenol passing downwardly through these holes will be jetted into or dispersed in the oil. This will have the effect of mixing the phenol and the oil to form an unstable emulsion. The emulsion of phenol and oil will then move more or less horizontally across the tower towards the opposite wall of the tower. During this horizontal passage, separation of the phenol and oil will occur so that a settled oil phase will form along the lower portion of an upper plate, while settled phenol will form along the upper side of the next lower plate. This settling is facilitated by the sloping planes provided to define and limit the settling zone. Thus, as the emulsion moves across the tower, the vertical displacement between adjacent plates is enlarged so as to slow the horizontal velocity of the two phases, aiding in the separation of these phases. The separated oil phase may then continue upwardly through the tower while the separated phenol phase may continue downwardly through perforations 5 in the manner indicated.

In this type of operation, it is apparent that the inclined plane construction permits little opportunity for any eddying or remixing of the liquid phases in the settling zone. Again, the fact that the dispersing holes are horizontally displaced from the portion of the tower through which the light phase rises, eliminates the possibility for light phase liquid to pass upwardly through the dispersion holes. It is a particular feature that if the light phase liquid is comparatively viscous, as in the case of oil, flow of this viscous phase can occur through the tower in a manner imposing little resistance to flow. It may further be noted that the apparatus described is also particularly adapted to the contacting of a large amount of heavy phase liquid with a small amount of light phase liquid. This is true for the reason that in such systems it is difficult to cause all of the heavy phase liquid to contact the comparatively small portion of light phase liquid. Insofar as the heavy phase liquid is dispersed into the light phase liquid, this contacting can be effectively carried out to achieve optimum contacting efficiency in the tower described.

It should particularly be noted that real advantages may be secured in the contacting of other liquid-liquid systems by inverting the tray design described. Thus, while the plate arrangement heretofore described is particularly adapted for the contacting of systems such as phenol and oil, by inverting the plates, improved contacting efficiency will be obtained for systems such as sulfuric acid and naphtha, and vacuum tower residuum and propane, and carbon tetrachloride and water.

What is claimed is:

1. In a liquid-liquid contacting tower, contacting means comprising a plurality of vertically displaced plate members, each of said plate members comprising a first imperforate plate element fixed to the said tower, a second perforated plate element fixed to said first plate element in upwardly inclined relation, and a third imperforate plate element joined to said second plate element extending across the tower in spaced relation to the opposite side of the tower, each plate member being rotated 180° with respect to the next lower plate member whereby each successive plate member is fixed to alternate sides of said tower.

2. The apparatus defined by claim 1 in which the said third plate element has a substantially greater length across the tower than said first and second plate elements.

3. The apparatus defined by claims 1 in which the said first plate element is substantially horizontal, said second plate element is inclined upwardly at an angle of about 20° to 70° from the horizontal, and the said third plate element is inclined upwardly at an angle of about 1° to 6°.

4. In a liquid-liquid contacting tower, contacting means comprising a plurality of vertically displaced plate members, each of said plate members comprising a first imperforate plate element fixed to the said tower, a second perforated plate element fixed to said first plate element in upwardly inclined relation, a third imperforate plate element joined to said second plate element extending substantially across the tower, and a fourth imperforate plate member joined to said third plate member in upwardly inclined relation terminating at a spaced distance from the opposite side of the tower, each plate member being rotated 180° with respect to the next lower plate member whereby each successive plate member is fixed to alternate sides of said tower.

5. The apparatus defined by claim 4 in which the said third plate element has a substantially greater length across the tower than said first, second and fourth plate element.

6. The apparatus defined by claim 4 in which the said first plate element is substantially horizontal, said second plate element is inclined upwardly at an angle of about 20° to 70° from the horizontal, said third plate element is inclined upwardly at an angle of about 1° to 6° from the horizontal and said fourth plate element is inclined upwardly at an angle of about 20° to 70° from the horizontal.

JOHN M. BRADLEY.

References Cited in the file of this patent

UNITED STATES PATENTS

| Number | Name | Date |
|---|---|---|
| 959,350 | Johnson | May 24, 1910 |
| 1,269,423 | Graham | June 11, 1918 |
| 2,111,360 | Cutting | Mar. 15, 1938 |
| 2,250,976 | Van Dijck | July 29, 1941 |
| 2,271,462 | Pfennig | Jan. 27, 1942 |
| 2,528,426 | Davis et al. | Oct. 31, 1950 |

FOREIGN PATENTS

| Number | Country | Date |
|---|---|---|
| 13,017 | Great Britain | Sept. 26, 1887 |
| 487,481 | France | July 9, 1918 |
| 538,965 | France | June 17, 1922 |